United States Patent [19]

Ahmed et al.

[11] Patent Number: 4,728,483
[45] Date of Patent: Mar. 1, 1988

[54] APPARATUS FOR INTEGRATED FUEL ASSEMBLY INSPECTION SYSTEM

[75] Inventors: Hassan J. Ahmed; Steven R. Burchill, both of Columbia, S.C.

[73] Assignee: Westinghouse Electric Corp., Pittsburgh, Pa.

[21] Appl. No.: 855,266

[22] Filed: Apr. 24, 1986

[51] Int. Cl.$^4$ .............................................. G21C 17/00
[52] U.S. Cl. .................................... 376/258; 376/245; 376/248; 33/502
[58] Field of Search ............... 376/261, 249, 245, 248, 376/258, 463, 260; 33/533, 562, 559, 549, 502

[56] References Cited

U.S. PATENT DOCUMENTS

| | | | |
|---|---|---|---|
| 3,901,090 | 8/1975 | Akey et al. | 376/245 |
| 4,048,009 | 9/1977 | Weilbacher | 376/245 |
| 4,197,652 | 4/1980 | Qurnell et al. | 376/245 |
| 4,274,205 | 6/1981 | Starr et al. | 376/245 |
| 4,464,332 | 8/1984 | Boisseuil et al. | 376/248 |
| 4,526,311 | 7/1985 | Schroder | 376/249 |
| 4,583,297 | 4/1986 | Jewell | 33/533 |
| 4,639,993 | 2/1987 | Kapoor | 376/261 |
| 4,655,993 | 4/1987 | Scharpenberg | 376/245 |
| 4,657,728 | 4/1987 | Coppa et al. | 376/261 |

FOREIGN PATENT DOCUMENTS

| | | | |
|---|---|---|---|
| 0123597 | 10/1984 | European Pat. Off. | 376/245 |
| 2930389 | 2/1980 | Fed. Rep. of Germany | 376/249 |
| 3404574 | 8/1985 | Fed. Rep. of Germany | 376/248 |
| 3419765 | 11/1985 | Fed. Rep. of Germany | 376/245 |
| 0105692 | 8/1979 | Japan | 376/249 |
| 0118979 | 9/1979 | Japan | 376/261 |
| 0159599 | 12/1979 | Japan | 376/463 |
| 0010409 | 1/1982 | Japan | 376/245 |
| 0060395 | 4/1984 | Japan | 376/245 |

Primary Examiner—Deborah L. Kyle
Assistant Examiner—Daniel Wasil

[57] ABSTRACT

An apparatus for an integrated and automated fuel assembly inspection system includes a support base, an elongated fixture, top and bottom carriages and a pedestal. The top carriage is mounted to a pair of tracks on the fixture for vertical movement therealong. The pedestal is mounted on the base and aligned with the top carriage for supporting a nuclear fuel assembly therebetween. The bottom carriage has a central opening adapted to receive the fuel assembly therethrough such that the bottom carriage surrounds all sides of the fuel assembly. Also, the bottom carriage is mounted to the tracks for generally vertical movement along the fixture and the fuel assembly. D.C. stepping motors are mounted on the top and bottom carriages and coupled to a gear track for selectively driving the carriages along the fixture. Proximity sensors are movably disposed on the bottom carriage adjacent the sides of the fuel assembly for measuring its envelope when the bottom carriage is moved to and stationed at selected axial positions along the fuel assembly. Lasers and photodetectors are disposed on the top and bottom carriages for continuously monitoring fixture out-of-straightness and performing correction. Capacitive probes are disposed on the bottom carriage for measuring channel spacing between fuel rods of the fuel assembly, and photoswitches and an optical scale are disposed on the bottom carriage and the fixture for measuring fuel assembly length when the bottom carriage has been moved between the bottom and top nozzles of the fuel assembly.

15 Claims, 7 Drawing Figures

APPARATUS FOR INTEGRATED FUEL ASSEMBLY INSPECTION SYSTEM

CROSS REFERENCE TO RELATED APPLICATION

Reference is hereby made to the following copending application dealing with related subject matter and assigned to the assignee of the present invention: "Position Sensing Apparatus" by George S. Jewell, assigned U.S. Ser. No. 678,520 and filed Dec. 5, 1984 now U.S. Pat. No. 4,583,297.

BACKGROUND OF THE INVENTION

1. Field of the Invention

The present invention relates generally to fuel assemblies for nuclear reactors and, more particularly, is concerned with an apparatus used in an automated system for inspecting a fuel assembly for envelope, channel spacing and length and also for correcting error in the inspection fixture of the apparatus.

2. Description of the Prior Art

In most nuclear reactors, the reactor core is comprised of a large number of elongated fuel assemblies. Conventional designs of these fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the guide thimbles which extend above and below the opposite ends of the fuel rods. The fuel rods which contain fissile material are grouped together in a closely-spaced array within each fuel assembly and the fuel assemblies, in turn, are mounted in side-by-side closely-spaced relationship with one another between the upper and lower core plates so as to provide a neutron flux in the core sufficient to support a high rate of nuclear fission and thus the release of a large amount of energy in the form of heat.

In view of the densely-packed condition of the fuel rods and fuel assemblies in the core, the dimensional standards of envelope and length of each fuel assembly and the channel spacing between the adjacent fuel rods of each fuel assembly must be met within very close tolerances. Thus, at the completion of manufacture of each fuel assembly, quality control inspections are carried out to determine whether the fuel assembly meets the aforementioned dimensional standards. Currently, the fuel assembly quality inspection is performed at three separate stations: (1) envelope measurement; (2) channel spacing; and (3) length measurement.

At the envelope measurement station, the out-of-straightness of the fuel assembly is quantified. The sides of a fuel assembly are normally not perfectly straight. The fuel assembly commonly exhibits a slight bow and twisting. Quantifying this behavior is performed by measuring the relative position of the grids to each other and inspecting for excessive displacements. The current method of envelope measurement uses twelve LVDT sensors mounted in a configuration of three sensors per side. A set of distance measurements is taken at each grid location to signify whether the grid is located either left/right or back/front of the center of the fuel assembly. At the channel spacing station, the distance between adjacent fuel rods within a fuel assembly is checked. Currently, an operator manually pulls a strain gauge probe through a channel and a computer translates the sensor output into distance measurements.

At the length measurement station, the fuel assembly length is measured using a stick micrometer. The fuel assembly is set upright on a level table and an inspector measures the distance from the table surface to the bottom edge of the top nozzle.

From the foregoing brief description of current practices, it will be readily understood that these stations are manual in nature, requiring an inspector to monitor equipment and process data. Consequently, a need has emerged to improve and automate the way in which fuel assembly inspection is carried out.

SUMMARY OF THE INVENTION

The present invention provides an apparatus for use in an integrated fuel assembly inspection system designed to satisfy the aforementioned needs. In contrast to the previous practices, the fuel assembly inspection apparatus of the present invention allows a fully integrated system wherein all inspections are performed in one station in a completely automated manner and all measurements are made using non-contact sensing techniques. Also, for increased accuracy of fuel assembly envelope measurement, the apparatus facilitates performance of correction for inspection fixture error on a real-time basis instead of on a sampled basis.

Accordingly, the present invention is directed to fuel assembly inspection apparatus, comprising: (a) an elongated fixture mounted in a stationary upright position; (b) upper means mounted to an upper portion of the fixture and lower means mounted adjacent to a lower portion of the fixture for supporting a nuclear fuel assembly therebetween and extending along the fixture; (c) a bottom carriage having a central opening adapted to receive the fuel assembly therethrough when supported between the upper means and the lower means such that the bottom carriage will surround all sides of the fuel assembly, the bottom carriage being mounted to the fixture for generally vertical movement along the fixture and the fuel assembly; and (e) drive means for selectively moving the bottom carriage.

In addition, means are disposed on the bottom carriage for measuring the fuel assembly envelope when the bottom carriage is moved to and stationed at selected axial positions along the fuel assembly. The envelope measuring means includes a single-axis positioning table disposed on each side of the bottom carriage adjacent a side of the fuel assembly, a proximity sensor mounted on each positioning table for movement along the adjacent side of the fuel assembly, and power means coupled to each sensor for stationing the sensor at a home position while the bottom carriage is moving along the fuel assembly and for sweeping the sensor relative to the side of the fuel assembly away from and back to the home position once the carriage is positioned at one of the selected axial positions along the fuel assembly.

Further, means are disposed on the upper means and the bottom carriage for continuously monitoring fixture out-of-straightness and performing correction of the envelope measurement in response thereto. The monitoring and correction performing means includes a pair of X-Y axes lasers mounted on one of the upper means and the bottom carriage adjacent the fuel assembly, and a pair of matched X-Y photodetectors mounted on the other of the upper means and the bottom carriage adjacent the fuel assembly. The respective lasers provide straight line reference used to excite the corresponding photodetectors. The pairs of lasers and photodetectors facilitate measuring of both translational and rotational motion of the bottom carriage as the same moves up along the fuel assembly for facilitating adjustment of the envelope measurment for any fixture error at each of the axial positions along the fuel assembly.

Still further, means are disposed on the bottom carriage for measuring channel spacing between fuel rods of the fuel assembly. The channel spacing measuring means includes a single-axis positioning table located on each of a pair of adjacent sides of the fuel assembly, a capacitive probe mounted on each of the tables for movement along the side of the fuel assembly, and motive means for driving the probe to specified channels locations along the fuel assembly side for taking channel spacing measurements once the bottom carriage is positioned at one of the selected axial positions along the fuel assembly.

Finally, means are disposed on the bottom carriage and the fixture for measuring fuel assembly length when the bottom carriage has been moved between the bottom and top nozzles of the fuel assembly. The fuel assembly length measuring means includes a photoswitch mounted on each side of the bottom carriage adjacent a side of the fuel assembly and operable to detect an edge of the respective bottom and top nozzles of the fuel assembly, and means forming an optical scale mounted on the fixture and the bottom carriage for determining the position of the carriage as it moves along the fuel assembly when each photoswitch detects the respective edges of the bottom and top nozzles for deriving the length of the fuel assembly.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
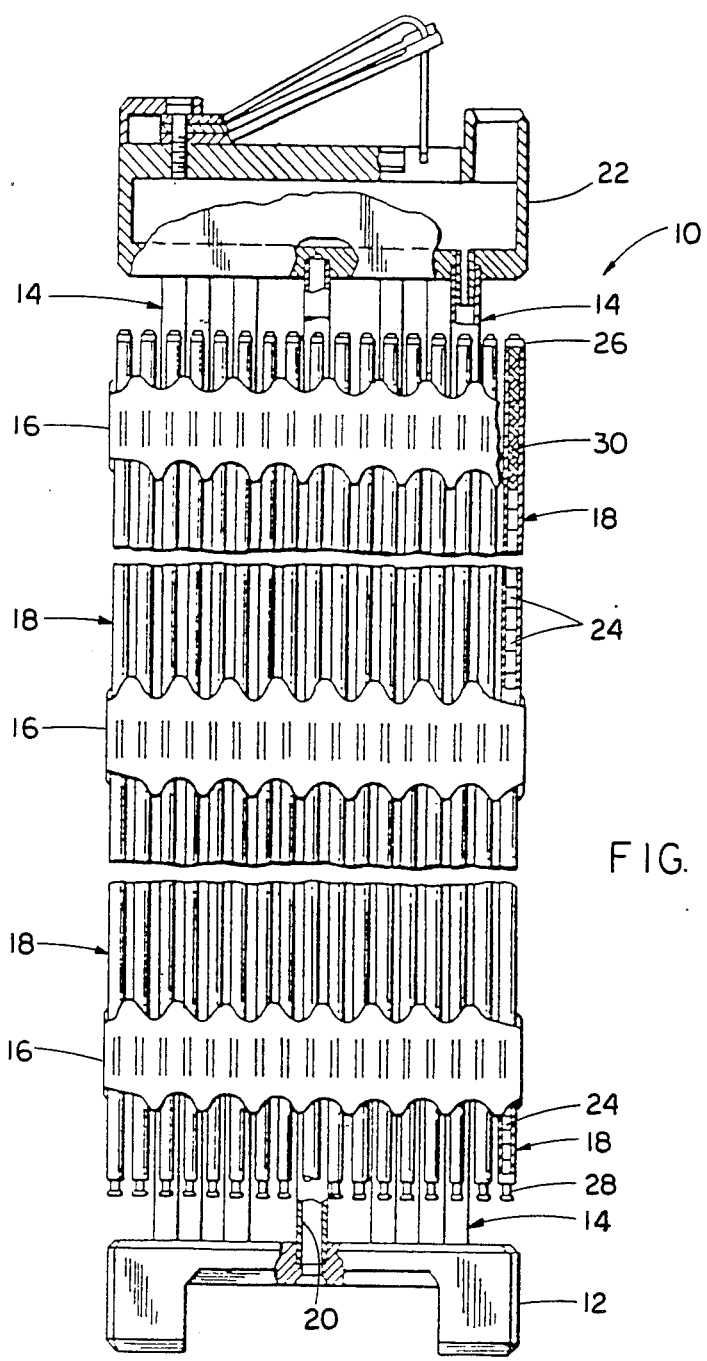
FIG. 1 is an elevational view, partly in section, of a fuel assembly capable of being inspected by an integrated and automated system in which the apparatus of the present invention is employed.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in closely spaced relationship with one another by the grids 16 spaced along the fuel assembly length. Each fuel rod 18 contains nuclear fuel pellets 24 and is closed at its opposite ends by upper and lower end plugs 26,28 so as to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the guide thimbles 14 and along the fuel rods 18 of the fuel assembly 10 in order to extract heat generated therein for the production of useful work.

APPARATUS FOR INTEGRATED FUEL ASSEMBLY INSPECTION SYSTEM

At the completion of manufacture of the fuel assembly 10, an inspection of the fuel assembly 10 is performed to determine whether it meets the rigorous dimensional standards required to place it in a tight operating position with other fuel assemblies in a reactor core. In FIGS. 2 to 7, there is shown an apparatus, generally designated by the numeral 32 and comprising the preferred embodiment of the present invention, which is utilized in an integrated and automated system for inspecting the dimensional integrity of the fuel assembly 10 in terms of its envelope and length and the spacing between its fuel rods 18. All inspection procedures are carried out with the fuel assembly 10 placed on the single apparatus 32, thus eliminating the necessity of being moved from station to station to complete the various measurements of the inspection, as was the case previously.

Figure 2:
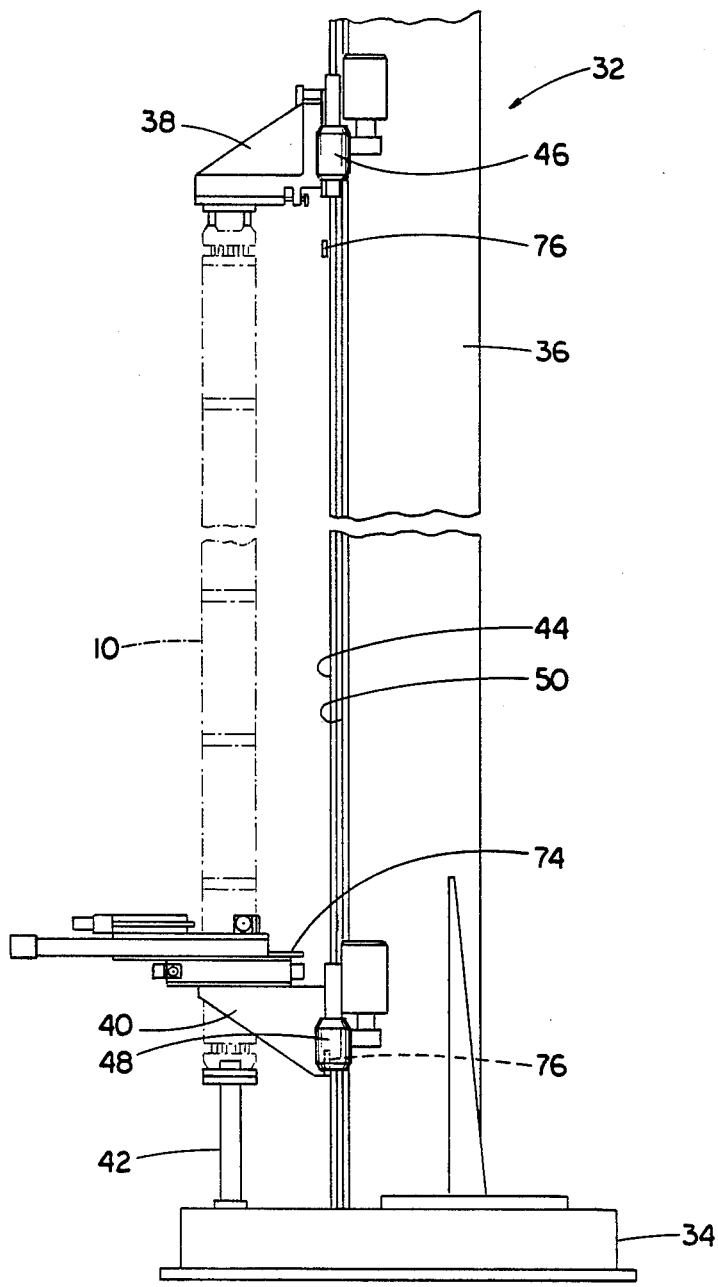
FIG. 2 is a side elevational view of the inspection apparatus of the present invention, showing the fuel assembly positioned thereon in phantom outline form and illustrating the fuel assembly length measuring components mounted on a bottom carriage and an upright fixture of the apparatus.
Figure 3:
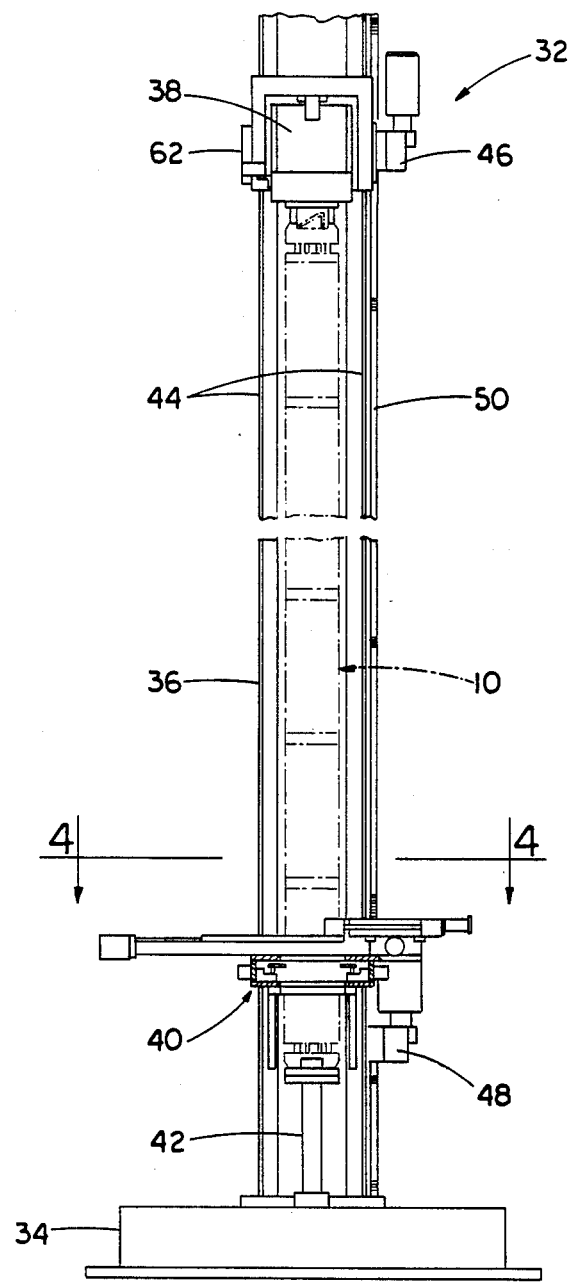
FIG. 3 is a front elevational view of the inspection apparatus of FIG. 2, showing the fuel assembly positioned thereon in phantom outline form and illustrating the self-calibration components mounted on the bottom carriage and fixture which adjusts for any out-of-straightness in the fixture.

Referring to FIGS. 2 and 3, in addition to various measurement components to be described hereafter, the fuel assembly inspection apparatus 32 basically includes a support platform or base 34, an elongated fixture 36, top and bottom carriages 38,40 and a pedestal 42. The fixture 36 is mounted in a stationary upright position upon the base 34. Both top and bottom carriages 38,40 are mounted on, and extend in cantilever fashion forwardly and outwardly from, common, parallel vertical rails or tracks 44 fixed on the front side of the fixture 36 for movement vertically therealong away from and toward one another and the base 34. The pedestal 42 is stationarily mounted on the base 34 adjacent to, but spaced in front of, the fixture 36 and aligned with the top carriage 38 for supporting therebetween and along the fixture 36 the nuclear fuel assembly 10 (seen in phantom outline form) to be inspected.

Movement of the top carriage 38 is generally confined to along a limited upper extent of the fixture 36 which only occurs during placement of the fuel assembly 10 on the apparatus 32, whereas the bottom carriage 40 is more extensively moved between the pedestal 42 and the top carriage 38 during performance of the measurement operations by the apparatus 32. The top and bottom carriages 38,40 are selectively driven along the fixture 36 by d.c. stepping motors 46,48 mounted thereon and drivingly coupled to a gear track 50 fixed along the right side of the fixture, as seen in FIGS. 2 and 3. Also, as clearly depicted in FIGS. 4 to 6, the bottom carriage 40 has central opening 52 sized to receive the fuel assembly 10 therethrough when supported between the upper carriage 38 and lower pedestal 2. In such manner, the bottom carriage 40 surrounds all sides of the fuel assembly 10 and travels therealong as it moves along the fixture 36.

The several different measurements performed heretofore at different or separate stations are now performed at a common, integrated station defined by the inspection apparatus 32. Components are disposed on the apparatus 32 for measuring the envelope and length of the fuel assembly 10 and channel spacing between the fuel rods 18 of the fuel assembly. Also, the apparatus 32 includes self-calibration components for continuously monitoring the fixture 36 for any out-of-straightness for adjusting the envelope measurement to compensate for such condition of the fixture. The inspection procedure is initiated by placing the fuel assembly 10 into the fixture 36, i.e. by placing its bottom nozzle 12 on the pedestal 42 and then lowering the top carriage 38 onto the top nozzle 22 to hold the fuel assembly stationary. Then, the bottom carriage 40 is moved along the length of the fuel assembly 10 taking measurements at the bottom nozzle 12, the grids 16, midspans and the top nozzle 22 of the fuel assembly. A computer (not shown) is responsible for stepping motor control, data acquisition, and issuing a comprehensive report upon completion of the fuel assembly inspection.

Figure 6:
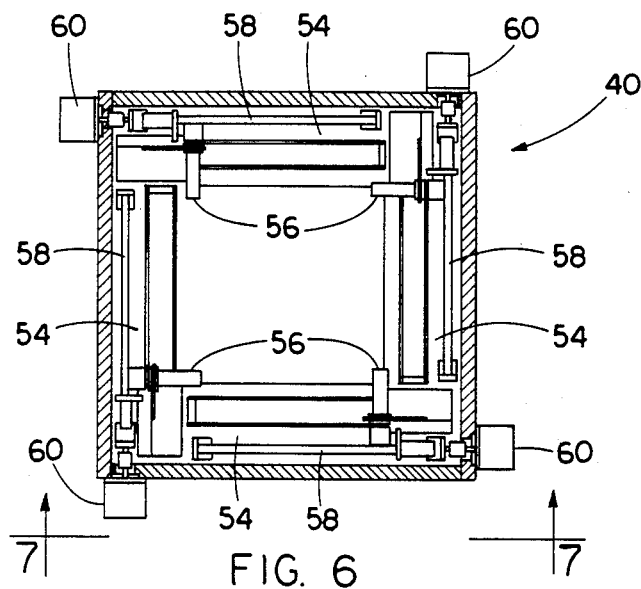
FIG. 6 is a top plan view, partly in section, of the lower portion of the bottom carriage as seen along line 6—6 of FIG. 5, showing the envelope measurement components mounted thereon.
Figure 5:
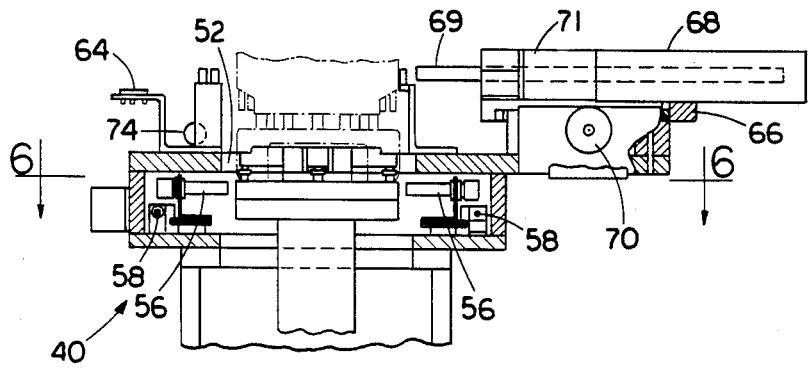
FIG. 5 is a side elevational view, partly in section, of the bottom carriage as seen along line 5—5 of FIG. 4, showing the channel spacing measurement and envelope measurement components mounted thereon.
Figure 7:
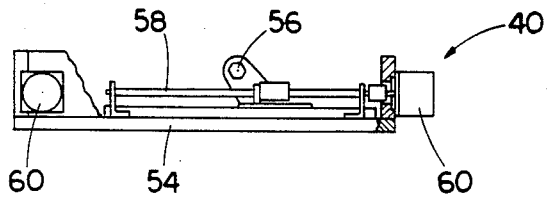
FIG. 7 is an end elevational view of the lower portion of the bottom carriage as seen along line 7—7 of FIG. 6, showing the envelope measurement components mounted thereon.

In particular, as seen in FIGS. 5 to 7, components on the bottom carriage 40 for measuring fuel assembly envelope, when the bottom carriage is moved to and stationed at selected axial positions along the fuel assembly 10, include a plurality of sets of single-axis positioning tables 54, proximity sensors 56, feed screws 58 and d.c. stepping drive motors 60. Each set is disposed on one of four sides of bottom carriage 40 encompassing the central opening 52 thereof and adjacent to one of four sides of the fuel assembly 10.

In each set, the feed screw 58 is rotatable mounted on the table 54 and coupled with the sensor 56 and motor 60 such that upon rotation of the screw 58 by the motor 60, the sensor 56 is moved linearly along the respective fuel assembly side. Preferably, each motor 60 accurately moves the respective sensor 56 across the side to record a distance measurement at three locations. The sensors 56 are stationed in a "home" position while the bottom carriage 40 travels up along the fuel assembly 10. Once the bottom carriage 40 is positioned at a grid, each sensor 56 sequentially sweeps across its respective side and then returns to its home position.

The proximity sensors 56 are, preferably, conventional off-the-shelf devices, for instance ELECTROMIKE sensors designated as model #PA115-03, of the type using non-contact sensing, having high accuracy and a linear response, capable of integrating measurement over an area, and having sufficient range of distance measurement. Their principle of operation is based on eddy currents. The sensor produces an inductive field which will generate eddy currents in any metal target within its range. These eddy currents change the state of the field which can be translated into a signal output that is proportional to the distance from sensor to target.

Figure 4:
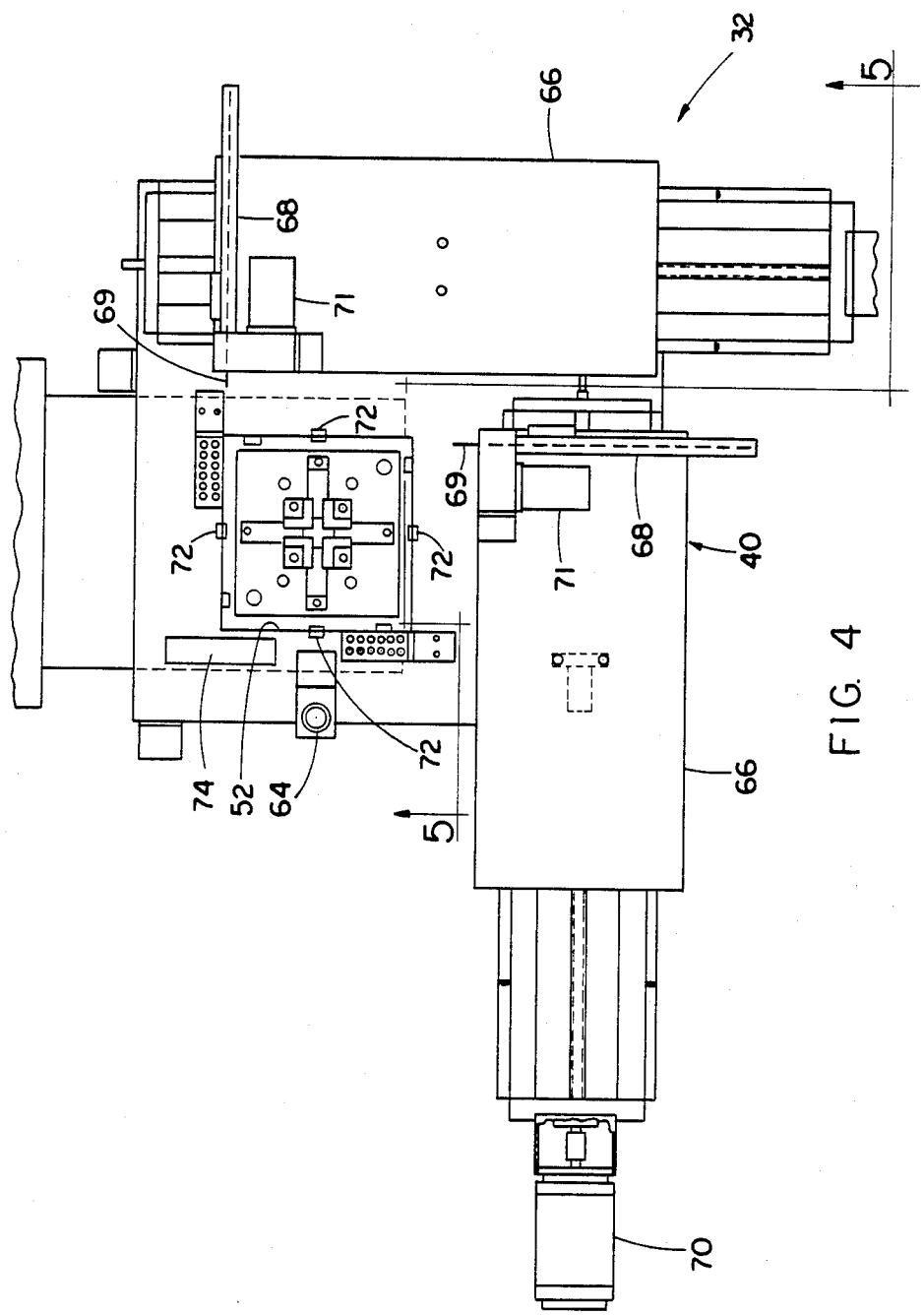
FIG. 4 is an enlarged top plan view of the bottom carriage of the apparatus as seen along line 4—4 of FIG. 3, showing the channel spacing measurement and fixture out-of-straightness self-calibration components mounted thereon.

As seen in FIGS. 2 and 4, self-calibration components disposed on the top and bottom carriages 38,40 for continuously monitoring out-of-straightness of the fixture 36 and facilitating correction of the envelope measurement, as the bottom carriage 40 travels up the fuel assembly 10, include a pair of X-Y axes lasers 62 and a pair of Z-Y axes photodetectors 64 (only one of each pair is shown). The two lasers 62 are mounted on to the top carriage 38 and the two photodetectors 64 are mounted on the bottom carriage 40. Each laser beam is a straight line reference used to excite each photodetector 64. The photodetector output indicates a deflection of the bottom carriage 40 in the left/right and the back/front direction. Two laser/photodetector pairs are required to measure both translational and rotational motion of the bottom carriage 40. As the bottom carriage 40 travels up along the fuel assembly 10, the computer will adjust the envelope measurement for any fixture error measured at each grid.

A linear photodetector which can be used to track the motion of the bottom carriage 40 is the United Detector Technology model UDT SC/25 with its compatible amplifier model UDT 301B-AC. The straight line reference can be obtained by using a low power Helium-Neon laser, such as one manufactured by Uniphase, being designated as model 1103P.

Turning now to FIGS. 4 and 5, components disposed on the bottom carriage 40 for measuring channel spacing between fuel rods 18 of the fuel assembly 10 include a single-axis positioning platform 66 located on each of a pair of adjacent sides of the fuel assembly 10, probe housings 68 mounted on the respective platforms 66 for movement along the sides of the fuel assembly 10, and motive means in the form of d.c. stepping motors 70 to drive the platforms 66. Each probe housing 68 contains a probe 69 mounted in a track and motive means in the form of d.c. stepping motors 71 to drive probe 69 in and out of probe housing 68. Preferably, the probes 69 are of the capacitive type, such as HITEC capacitive probes.

Once the bottom carriage 40 is positioned at one of the selected axial positions along the fuel assembly and after the motors 70 are operated to move the probe housings 68 to specified channel locations along the fuel assembly sides, the probes 69 are then actuated for taking channel spacing measurements. In particular, the probes 69 are moved in between the fuel rods 18 by stepping motors 71 until the end of the probe 69 extends through the opposite side of the fuel assembly 10. The channel spacing measurement is taken while stepping motor 71 retracts the probe back through the fuel assembly 10. The signal produced by the probe 69 is processed by electronic circuitry not shown.

As seen in FIG. 2, components disposed on the bottom carriage 40 and the fixture 36 for measuring fuel assembly length, starting with movement of the bottom carriage 40 at the bottom nozzle 12 of the fuel assembly 10 and finishing at the top nozzle 22 thereof, includes four photoswitches 72 and the combination of a laser 74 and two linear photodetectors 76. One photoswitch 72 is mounted on each side of the bottom carriage 40 adjacent each side of the fuel assembly 10 and operable to detect a leading edge of the respective bottom and top nozzle 12,22. Also, the laser 74 and linear photodetectors 76 form a linear scale. The position of the bottom carriage 40 is measured using the two linear photodetectors 76 mounted on the fixture 36, one near the bottom nozzle 12 and the other near the top nozzle 22. The locations of these photodetectors are precisely known so that a laser beam traveling from the laser 74 on the bottom carriage 40 can be used to accurately measure the position of the bottom carriage. As the bottom carriage 40 travels up the fuel assembly 10, the photoswitches 72 will detect the edge of the respective nozzle. When an edge is detected, the position of the carriage is recorded. Once the positions of the bottom and top nozzles are determined, an assembly length can be derived by computer.

The main principle of the length measurement is to accurately determine the position of the bottom carriage 40 as it travels across the bottom and top nozzles 12,22. The edge detectors or photoswitches will signal when the bottom carriage is in position and the linear scale mounted on the fixture 36 will convert the position into an actual length. The photoswitches 72 are non-contact devices which have both a light source and a photodetector. A device called a SCAN-A-MATIC sensor can be used. The linear scale could either be optical, as described above, or magnetic. The magnetic scale is constructed with small evenly spaced lines of magnetic material. A magnetic switch located on the bottom carriage would count the lines as the bottom carriage travels along the assembly. The location of the linear scales on the fixture must be precisely measured to assure an accurate assembly length measurement.

It is thought that the present invention and many of its attendant advantages will be understood from the foregoing description and it will be apparent that various changes may be made in the form, constuction and arrangement thereof without departing from the spirit and scope of the invention or sacrificing all of its material advantages, the form hereinbefore described being merely a preferred or exemplary embodiment thereof.

We claim:

1. In a fuel assembly inspection apparatus, the combination comprising:
    (a) an elongated fixture mounted in a stationary upright position;
    (b) upper means mounted to an upper portion of said fixture and lower means mounted adjacent to a lower portion of said fixture, said upper and lower means being disposed outwardly from a side of said fixture for supporting a nuclear fuel assembly therebetween and extending along said side of said fixture;
    (c) a bottom carriage having a central opening adapted to receive the fuel assembly therethrough when supported between said upper and lower means such that said bottom carriage extends about said fuel assembly, said bottom carriage being connected only to, and extending in cantilever fashion outwardly from, said side of said fixture for generally vertical movement along said side of said fixture and along said fuel assembly extending along said side of said fixture;
    (d) drive means for selectively moving said bottom carriage; and
    (e) means disposed on said bottom carriage for measuring the envelope of said fuel assembly when said bottom carriage is moved to and stationed at selected axial positions along said fuel assembly.

2. The apparatus as recited in claim 1, wherein said enelope measuring means includes;
    a proximity sensor mounted on each side of said bottom carriage adjacent a side of said fuel assembly for movement along said adjacent side of said fuel assembly; and
    power means coupled to each said sensor for stationing said sensor at a home position while said bottom carriage is moving along said fuel assembly and for sweeping said sensor relative to said side of said fuel assembly away from and back to said home position once said carriage is positioned at one of said selected axial positions along said fuel assembly.

3. In a fuel assembly inspection apparatus, the combination comprising:
    (a) an elongated fixture mounted in a stationary upright position;
    (b) upper means mounted to an upper portion of said fixture and lower means mounted adjacent to a lower portion of said fixture, said upper and lower means being disposed outwardly from a side of said fixture for supporting a nuclear fuel assembly therebetween and extending along said side of said fixture;
    (c) a bottom carriage having a central opening adapted to receive the fuel assembly therethrough when supported between said upper and lower means such that said bottom carriage extends about said fuel assembly, said bottom carriage being connected only to, and extending in cantilever fashion outwardly from, said side of said fixture for generally vertical movement along said side of said fixture and along said fuel assembly extending along said side of said fixture;
    (d) drive means for selectively moving said bottom carriage; and
    (e) means disposed on said upper means and said bottom carriage for measuring channel spacing between fuel rods of the fuel assembly.

4. The apparatus as recited in claim 3, wherein said channel spacing measuring means includes:
   a single-axis positioning platform located on each of a pair of adjacent sides of said fuel assembly;
   a capacitive probe mounted on each of said platforms for movement along said side of said fuel assembly; and
   motive means for driving said probe to specified channel locations along said fuel assembly side for taking channel spacing measurements once said bottom carriage is positioned at one of said selected axial positions along said fuel assembly.

5. In a fuel assembly inspection apparatus, the combination comprising:
   (a) an elongated fixture mounted in a stationary upright position;
   (b) upper means mounted to an upper portion of said fixture and lower means mounted adjacent to a lower portion of said fixture, said upper and lower means being disposed outwardly from a side of said fixture for supporting a nuclear fuel assembly therebetween and extending along said side of said fixture;
   (c) a bottom carriage having a central opening adapted to receive the fuel assembly therethrough when supported between said upper and lower means such that said bottom carriage extends about said fuel assembly, said bottom carriage being connected only to, and extending in cantilever fashion outwardly from, said side of said fixture for generally vertical movement along said side of said fixture and along said fuel assembly extending along said side of said fixture;
   (d) drive means for selectively moving said bottom carriage;
   (e) means disposed on said bottom carriage for measuring the envelope of said fuel assembly when said bottom carriage is moved to and stationed at selected axial positions along said fuel assembly; and
   (f) means disposed on said upper means and bottom carriage for continuously monitoring fixture out-of-straightness and performing correction of the envelope measurement in response thereto.

6. The apparatus as recited in claim 5, wherein said monitoring and correction performing means includes:
   a pair of X-Y axes lasers mounted on one of said upper means and said bottom carriage adjacent said fuel assembly; and
   a pair of matched X-Y photodetectors mounted on the other of said upper means and said bottom carriage adjacent said fuel assembly, said respective lasers providing straight line references used to excite said corresponding photodetectors and said pairs thereof measuring both translational and rotational motion of said bottom carriage as the same moves up along said fuel assembly for facilitating adjustment of the envelope measurement for any fixture error at each of said axial positions along said fuel assembly.

7. In a fuel assembly inspection apparatus, the combination comprising:
   (a) an elongated fixture mounted in a stationary upright position;
   (b) upper means mounted to an upper portion of said fixture and lower means mounted adjacent to a lower portion of said fixture, said upper and lower means being disposed outwardly from a side of said fixture for supporting a nuclear fuel assembly therebetween and extending along said side of said fixture;
   (c) a bottom carriage having a central opening adapted to receive the fuel assembly therethrough when supported between said upper and lower means such that said bottom carriage extends about said fuel assembly, said bottom carriage being connected only to, and extending in cantilever fashion outwardly from, said side of said fixture for generally vertical movement along said side of said fixture and along said fuel assembly extending along said side of said fixture;
   (d) drive means for selectively moving said bottom carriage; and
   (e) means disposed on said bottom carriage and said fixture for measuring fuel assembly length when said bottom carriage has been moved between bottom and top nozzles of said fuel assembly.

8. The apparatus as recited in claim 7, wherein said fuel assembly length measuring means includes:
   a photoswitch mounted on each side of said bottom carriage adjacent a side of said fuel assembly and operable to detect an edge of said respective bottom and top nozzles of said fuel assembly; and
   means forming an optical scale mounted on said fixture and said bottom carriage for determining the position of said carriage as it moves along said fuel assembly when said each photoswitch detects the respective edges of said respective bottom and top nozzles for deriving the length of said fuel assembly.

9. In a fuel assembly inspection apparatus, the combination comprising:
   (a) a support base;
   (b) an elongated fixture mounted in a stationary upright position upon said base and having track means extending along a front side of said fixture;
   (c) upper means mounted to an upper portion of said fixture and lower means mounted adjacent to a lower portion of said fixture, said upper and lower means being disposed outwardly from said front side of said fixture for supporting a nuclear fuel assembly therebetween and extending along said front side of said fixture;
   (d) a bottom carriage having a central opening adapted to receive the fuel assembly therethrough when supported between said upper means and lower means such that said bottom carriage will surround all sides of said fuel assembly, said bottom carriage being connected only to said track means, and extending in cantilever fashion outwardly from said front side, of said fixture above said base for generally vertical movement along said front side of said fixture and along said fuel assembly and toward and away from said base;
   (e) drive means for selectively moving said bottom carriage;
   (f) means disposed on said bottom carriage for measuring fuel assembly envelope when said bottom carriage is moved to and stationed at selected axial positions along said fuel assembly;
   (g) means disposed on said upper means and said bottom carriage for continuously monitoring fixture out-of-straightness and performing correction of the envelope measurement in response thereto;
   (h) means disposed on said bottom carriage for measuring channel spacing between fuel rods of the fuel assembly; and (i) means disposed on said bottom carriage and said fixture for measuring fuel assembly length when said bottom carriage has been moved between the bottom and top nozzles of the fuel assembly.

10. The apparatus as recited in claim 9. wherein said envelope measuring means includes:
   a single-axis positioning table disposed on each side of said bottom carriage adjacent a side of said fuel assembly;
   a proximity sensor mounted on each said positioning table for movement along said adjacent side of said fuel assembly; and
   power means coupled to each said sensor for stationing said sensor at a home position while said bottom carriage is moving along said fuel assembly and for sweeping said sensor relative to said side of said fuel assembly away from and back to said home position once said carriage is positioned at one of said selected axial positions along said fuel assembly.

11. The apparatus as recited in claim 9, wherein said monitoring and correction performing means includes:
   a pair of X-Y axes lasers mounted on one of said upper means and said bottom carriage adjacent said fuel assembly; and
   a pair of matched X-Y photodetectors mounted on the other of said upper means and said bottom carriage adjacent said fuel assembly, said respective laser providing straight line references used to excite said corresponding photodetectors and said pairs thereof measuring both translational and rotational motion of said bottom carriage as the same moves up along said fuel assembly for facilitating adjustment of the envelope measurement for any fixture error at each of said axial positions along said fuel assembly.

12. The apparatus as recited in claim 9, wherein said channel spacing measuring means includes:
   a single-axis positioning platform located on each of a pair of adjacent sides of said fuel assembly;
   a probe housing mounted on each of said platforms for movement along said side of said fuel assembly; and
   first motive means for driving said probe housing to specified channel locations along said fuel assembly side once said bottom carriage is positioned at one of said selected axial positions along said fuel assembly;
   a capacitive probe contained in each of said probe housings for movement projecting probe into channel of said fuel assembly; and
   motive means for driving said probe into specified channels between fuel rods along said fuel assembly side for taking channel spacing measurements.

13. The apparatus as recited in claim 9, wherein said fuel assembly length measuring means includes:
   a photoswitch mounted on each side of said bottom carriage adjacent a side of said fuel assembly and operable to detect an edge of said respective bottom and top nozzles of said fuel assembly; and
   means forming an optical scale mounted on said fixture and said bottom carriage for determining the position of said carriage as it moves along said fuel assembly when said each photoswitch detects the respective edges of said respective bottom and top nozzles for deriving the length of said fuel assembly.

14. The apparatus as recited in claim 9, wherein said upper means is a top carriage mounted to said track means on said fixture for generally vertical movement therealong toward and away from said base.

15. The apparatus as recited in claim 14, wherein said lower means is a pedestal mounted on said base adjacent said fixture and aligned with said top carriage for supporting a nuclear fuel assembly therebetween.

* * * * *